United States Patent [19]
Hesse et al.

[11] Patent Number: 5,591,810
[45] Date of Patent: Jan. 7, 1997

[54] CURABLE FURAN RESIN(S) MODIFIED WITH PHENOLIC RESIN(S) FOR USE AS BINDERS FOR CEMENTS AND COATING COMPOSITIONS HAVING IMPROVED THERMAL STABILITY PROCESSES FOR THEIR PREPARATION AND THEIR USE

[75] Inventors: Wolfgang Hesse, Taunusstein; Klaus Rauhut, Wiesbaden, both of Germany

[73] Assignee: Hoechst Aktiengesellschaft, Germany

[21] Appl. No.: 419,820

[22] Filed: Apr. 11, 1995

Related U.S. Application Data

[63] Continuation of Ser. No. 171,019, Dec. 21, 1993, abandoned.

[30] Foreign Application Priority Data

Dec. 23, 1992 [DE] Germany ............................ 42 43 797.0

[51] Int. Cl.$^6$ ............................ C08F 283/00; C08G 8/28; C08L 61/06
[52] U.S. Cl. ............................ 525/480; 528/129; 528/137; 528/144; 528/153; 525/481; 428/402; 428/407; 523/139; 523/143; 523/144; 523/145

[58] Field of Search ............................ 528/129, 137, 528/144, 153; 525/480, 481; 428/402, 407; 523/139, 143, 144, 145

[56] References Cited

U.S. PATENT DOCUMENTS 4,804,722  2/1989  Hesse et al. ............................ 525/523

Primary Examiner—Samuel A. Acquah
Attorney, Agent, or Firm—Bierman and Muserlian

[57] ABSTRACT

Curable furan resins modified with phenolic resins for use as binders for cements and coating compositions having improved thermal stability, processes for their preparation and their use.

Preparation of curable furan resins modified with phenolic resins based on condensation products of alkylidenepolyphenols of the novolak type with furfuryl alcohol or mixtures thereof with other reactive furan derivatives, furthermore curable solutions thereof in reactive organic solvents, processes for their preparation and their use as binders having improved thermal stability for preparing self-curing, chemically resistant and high-temperature-resistant cements and coating compositions.

5 Claims, No Drawings

CURABLE FURAN RESIN(S) MODIFIED WITH PHENOLIC RESIN(S) FOR USE AS BINDERS FOR CEMENTS AND COATING COMPOSITIONS HAVING IMPROVED THERMAL STABILITY PROCESSES FOR THEIR PREPARATION AND THEIR USE

PRIOR APPLICATION

This application is a continuation of U.S. patent application Ser. No. 171,019 filed Dec. 21, 1993, now abandoned.

The invention relates to curable furan resins modified with phenolic resins and based on condensation products of alkylidenepolyphenols of the novolak type with furfuryl alcohols or mixtures thereof with other reactive furan derivatives, furthermore to curable solutions thereof in reactive organic solvents, to processes for their preparation and their use as binders having improved thermal stability for producing self-curing, chemically resistant and high-temperature-resistant cements.

It is known to use polycondensation products of furfuryl alcohol as acid-curable binder resins for cements which are resistant to chemicals and heat. These cements contain, as further main components, inert fillers to which acids or acid-releasing substances are admixed as curing catalyst and which can effect curing of the binder resin without addition of heat.

German Patent 2,926,053 discloses the reaction of furfuryl alcohol with a hydroxymethyl-group containing alkylphenol of the resol type based on bifunctional alkylphenols at elevated temperature, followed by dissolution of the reaction product in at least one reactive thinner from the group comprising hydroxybenzyl alcohol, low-molecular-weight epoxy compounds, furfurol, difuryl ether, furfuryl alcohol, which is said to prevent the extensive aftershrinkage which, as is known, takes place in pure furan resin cements during the subsequent curing. Specifically, the use of low-molecular-weight epoxy compounds does not adversely affect the elastic performance of the cured products, but neither does it result in a substantially improved thermal stability and, on the other hand, makes the cured products, which is a drawback, sensitive to aggressive organic solvents such as are frequently used in practice, such as, for example, ketones, chlorinated aliphatic hydrocarbons, aromatic hydrocarbons and esters.

The presence of furfuryl alcohol in plastic cements comprising 1.5 to 1.6% by weight of furfuryl alcohol, 14 to 16% by weight of furan/epoxy resin binder, 2.8 to 3.2% by weight of polyethylene polyamine and inorganic fillers is, as disclosed in Soviet Patent 619,464, said, on the one hand, to increase the solidity of these cements and, on the other, to reduce aftershrinkage. Accordingly, products of this type are used in the building industry for producing corrosion-resistant surface coatings and as chemically resistant floor coating material. Their shrinkage during curing is about 0.75%, which is relatively high. These products, although being crosslinkable, are not suitable for producing cement resins or cements designed for applications with high chemical stress, since, owing to their amine content, they-inhibit the acid catalysis necessary for curing the cement and do not exhibit sufficient resistance to acid and alkali in the crosslinked state.

U.S. Pat. No. 4,100,314 discloses a crosslinkable surface coating agent for tar-impregnated carbon articles in the form of a synthetic resin solution containing crosslinking furan compounds, for example a mixture of equal amounts of furfurol and furfuryl alcohol, diethyl sulfate as the catalyst and epoxy resins. However, for crosslinking, it is necessary to heat to temperatures between 100° and 135° C., so that for this reason alone, the product is not suitable for producing cements, since cements have to be crosslinkable at room temperature or at least close to room temperature.

Furthermore it is known that furan resins can be modified in various ways using various additional components. Thus, furfurol can be reacted with phenol to give novolaks which can be used for producing phenolic resin molding compositions. However, owing to their too high intrinsic viscosity, resins of this type are not usable for producing cements.

It is also known to modify condensation products of furfuryl alcohol with urea and formaldehyde and to use these polycondensation products as binders for producing core-molded articles for metal casting. However, even this modification and the also known inclusion of phenol as modifiying component cannot improve the lack in resistance to chemicals and the insufficient heat resistance of these polycondensation products to the extent usually necessary for their use as crosslinkable binder for producing heat resistant cements and coating compositions.

Nor does the known reaction of furfuryl alcohol with phenols or with resorcinol lead to resins which are suitable for cements or coating compositions but gives resins which are only usable as binders for glues, molding compositions or paints. Nor does the reaction of hydroxybenzyl alcohol with furfuryl alcohol result in a usable cement resin, and the attempt to mix polycondensation products of this type with a filler containing acid curing catalysts immediately gives rise to a vigorous polymerization reaction. The resulting cured product shrinks and furthermore has insufficient resistance to alkali.

DE-A-2,750,704 discloses the preparation of reaction products from hydroxyaromatic compounds, formaldehyde and furfuryl alcohol, in which the furfuryl alcohol can also be used in excess, thus acting as a solvent. In addition, the reaction product can be cured with acid catalysts. The resol resin formed thereby and modified with furfuryl alcohol can be processed using reactive compounds, such as, for example, isocyanates, to give flame-resistant compact molded articles or foams. The use of these resins for preparing cements is neither described nor mentioned.

As is known, the furan resins hitherto commonly used in preparing acid-curing cements give cements having very good resistance to chemicals. The cured furan resin cements show in particular high resistance to alkali. However, a great disadvantage of cured furan resins is that heating causes them to burst in combination with aftershrinkage and to disintegrate into small pieces. This makes it impossible to make use of their chemical-thermal resistance which is actually very high. When used as a cement, the mechanical-thermal resistance limits their applicability to a maximum of 200° C. An analogous behavior is also displayed by coating compositions containing furan resin binder.

A further substantial drawback, apart from the high aftershrinkage, is the brittleness of the cements and coating compositions composed of furan resins. This brittleness shows itself in a high modulus of elasticity of 1.2 to 2×10$^4$ N/mm$^2$. In tile floorings made of acid-resistant ceramic materials and laid using furan resin cements, this brittleness can easily result in separation from the base and cracking, in particular if the different coefficients of thermal expansion of cement, ceramic materials and the base become effective as a result of a change in temperature. The reason for this is that the lower the modulus of elasticity of the cement, the higher the sensitivity of the composite made up of cement, ceramic material and base to cracking and separation upon a change in temperature. Advantageously, the modulus of elasticity of cements of industrial interest is <$1.2 \times 10^4$ N/mm$^2$. In this case, the cement is less brittle, thus allowing higher deformabilities without causing cracking and separation. The modulus of elasticity (E-modulus) can be determined, for example, by measuring the flexural modulus of elasticity of cured cement test specimens at room temperature.

Owing to the serious drawbacks exhibited by the known furan resins and already mentioned above in part, these resins have hitherto not gained great importance for use as binders for extremely high-temperature resistant and chemically resistant cements and coating compositions.

Accordingly, EP-A 0,184,106 furthermore discloses curable furan resins and furan resin solutions modified with epoxy resins for cements and coating compositions and their preparation by reaction of epoxy resins dissolved in furfuryl alcohol or mixtures thereof with other furan derivatives with furfuryl alcohol in the presence of catalysts at 20° to 200° C., any acid catalysts which may have been used being neutralized after reaction is complete. The curable resins and resin solutions prepared in this manner have a long shelf-life and cured cements prepared therefrom with addition of curing agents display all the known advantageous characteristics of furan resin cements, in particular excellent chemical resistance and heat resistance up to a maximum temperature of 320° C.

As a result of increased quality requirements and new tasks to be performed by cements in practice, a further increase of, in particular, the heat resistance of cured cements and their long-term heat resistance when used as binders for ceramic brick linings without impairing their chemical resistance and their elastic properties is desirable. Accordingly, the object of the invention was to provide curable furan resins from which cements can be prepared which even at temperatures of clearly above 320° C. can exhibit a favorable spectrum of properties.

Surprisingly, it has now been found that the stated object can be achieved by using, as the binder resins, condensation products of alkylidenepolyphenols of the novolak type with furfuryl alcohol or with mixtures of furfuryl alcohol with other reactive furan derivatives such as are obtainable by reaction of the components mentioned at reaction temperatures of, preferably, 80° to 250° C. in the presence of weakly acidic catalysts with elimination of water, preferably with continuous removal of the water of reaction, in particular by distillation from the equilibrium mixture of the reaction, instead of the furan resins based on furfuryl alcohol condensation products modified with epoxy resins as described in EP-A 0,184,106.

The solvent used for preparing resin solutions can be preferably the reactive furfuryl alcohol or mixtures of furfuryl alcohol with other reactive furan derivatives. The additional use of inert solvents may in some cases also be advantageous, in particular if they can also be used as entrainer for removal of the water of reaction during the condensation reaction by azeotropic distillation. A particularly preferred reactive solvent is furfuryl alcohol. Furthermore, reactive solvent mixtures of furfuryl alcohol with up to 50% by weight of other reactive furan derivatives, relative to the solvent mixture, preferably with furfurol and/or difuryl ether, are preferred. Solutions of furan resins according to the invention modified with phenolic resins in the reactive solvents or mixtures of the latter with inert solvents have a long shelf life in the absence of curing agents, which favors and facilitates their usability.

Cements containing, as the binder, a furan resin modified according to the invention with phenol resins and based on condensation products of alkylidenepolyphenols of the novolak type and furfuryl alcohol or mixtures thereof with other reactive furan derivatives possess, apart from the desired characteristics of known furan resin cements, the surprising property of being curable with very little shrinkage and no other disadvantages, showing little embrittlement and exhibiting, in cured form, a heat resistance of up to 400° C., which hitherto has not been possible, in terms of thermal stability, by means of known furan resin cements or modified furan resin cements of low embrittlement. In 30-minute heat resistance tests at the join of ceramic tiles, cured cements based on furan resins according to the invention modified with phenolic resins even give resistances of up to 600° C. Moreover, the cured cements according to the invention have exceptionally good resistance to chemicals, very good long-term heat resistance and a long usable life, and the readily curable starting resin solutions require a substantially shortened curing time compared with the prior art of furan resin technology.

Accordingly, the invention provides curable furan resins modified with phenolic resins for cements and coating compositions based on condensation products of furan compounds and phenols and their solutions in organic solvents, wherein the curable furan resins modified with phenolic resins comprise condensation products of alkylidenepolyphenols of the novolak type with furfuryl alcohol or mixtures of furfuryl alcohol with other reactive furan derivatives, preferably furfuryl alcohol, in which the alkylidenepolyphenols in the ortho and/or para positions relative to the phenolic hydroxyl groups are substituted by 2-furylmethyl radicals, which condensation products are obtained by reaction of alkylidenepolyphenols with furfuryl alcohol or mixtures thereof with other reactive furan derivatives in the presence of weakly acidic catalysts with elimination of water at reaction temperatures of 80° to 250° C., preferably 140° to 250 ° C., in particular 150° to 220° C., the acid catalyst, after reaction is complete, being, if desired, neutralized or removed, or the furan resins together with excess furfuryl alcohol remaining in the reaction mixture or subsequently admixed furfuryl alcohol or mixtures thereof with other reactive organic solvents, preferably from the group comprising furfurol, hydroxymethylfurfurol, difuryl ether and hydroxybenzyl alcohol, in particular furfuryl alcohol, if appropriate with additional amounts of inert solvents, forming readily curable, low- or high-viscosity resin solutions.

The term alkylidenepolyphenols is also understood to mean polyalkylidenepolyphenols and condensed phenolic resins generally known as novolaks prepared from phenols and oxo compounds with acid catalysis and based on, preferably, phenol, cresol, xylenols, alkylphenols or mixtures of these compounds, furthermore preferably bisphenols, in particular bisphenol A and bisphenol F, and, preferably, higher polyphenol condensation products having molecular weights of, preferably, 200 to 3000, in particular 300 to 800, the molecular weights being defined by the number average of the molecular weight, as the starting phenols. The oxo compounds used are preferably aldehydes, in particular aliphatic aldehydes, particularly preferably formaldehyde, in particular concentrated aqueous solutions thereof, or ketones, preferably acetone.

The invention furthermore provides curable resins for cements and coating compositions containing the readily curable furan resins described above and modified according to the invention by alkylidenepolyphenols, preferably in an amount of at least 10% by weight, relative to the curable resin mixture, low-viscosity solutions thereof in reactive organic solvents, preferably in furfuryl alcohol or in mixtures of furfuryl alcohol and other reactive furan derivatives and additionally, if desired, inert organic solvents, and their use for producing cements and coating compositions.

As a rule, the alkylidenepolyphenols used according to the invention are multinuclear phenols having at least two, preferably more than two, phenolic OH groups in the molecule, each of which has more than one reactive ring hydrogen atom in the ortho/ortho and/or para position per phenolic OH group. Prior to their reaction with furfuryl alcohol, the alkylidenepolyphenols are preferably substantially or completely freed from any starting phenols which may still be present therein and have not been reacted to form alkylidenepolyphenols by known methods.

The desired stoichiometric ratio between alkylidenepolyphenols and furfuryl alcohol or mixtures of furfuryl alcohol and other reactive furan derivatives for the condensation reaction can be calculated on the basis of the molar phenolic equivalent weight of the alkylidenepolyphenols. According to the invention, it is variable within wide limits. The upper limit is determined by the number of available reactive ring hydrogen atoms in the ortho or para position relative to the phenolic hydroxyl groups. However, in many cases it may be advantageous not to exploit this upper limit of the reactive potential fully but to remain below it. Accordingly, it is preferred to use between 0.1 and 1.5 mol, in particular between 0.2 and 0.8 mol, of furfuryl alcohol, or mixtures thereof with other furan derivatives of comparable reactivity which are equivalent thereto in terms of number of moles, per mole equivalent of phenolic hydroxyl group.

The reaction of the alkylidenepolyphenols with furfuryl alcohol or mixtures thereof with other furan derivatives of comparable reactivity takes place in the presence of weakly acidic catalysts, in the temperature range of 80° to 250° C., preferably 140° to 250 ° C. In this reaction, the OH group of, for example, furfuryl alcohol reacts with a reactive ring hydrogen atom of a phenolic radical of the alkylidenepolyphenol with elimination of water and attachment of the furfuryl alcohol radical to the alkylidenepolyphenol. In this condensation reaction, the water of reaction is continuously removed from the equilibrium mixture of the reaction, preferably by distillation, thus favoring and accelerating the reaction to give condensation products.

The continuous removal of the water of reaction from the reaction mixture can preferably be effected by azeotropic distillation with additional use of an entrainer and recycling of the latter. It is preferred to carry out the condensation reaction at temperatures of between 150° and 220° C. and to use weak acids as the weakly acidic catalyst, preferably, for example, oxalic acid, malonic acid, maleic acid, maleic anhydride, fumaric acid, succinic acid, tartaric acid or citric acid. The entrainers used for azeotropic distillation can be preferably distillable non-polar hydrocarbons, preferably aromatic hydrocarbons, in particular toluene or xylene.

Preferred furan derivatives of comparable reactivity, which, if desired, are used in a mixture with furfuryl alcohol, are furfurol and hydroxymethylfurfurol. The furfuryl alcohol content in such mixtures is preferably at least 50% by weight, in particular at least 70% by weight, relative to the mixture of the reactive furan derivatives. Particular preference is given to the sole use of furfuryl alcohol as the reactive furan component. The sole use of furfuryl alcohol as reactive solvent is also preferred in the preparation of solutions of furan resins according to the invention modified with alkylidenepolyphenols in reactive solvents for producing cements and coating compositions.

For some applications, the modified and readily curable furan resins prepared according to the invention by condensation of alkylidenepolyphenols with furfuryl alcohol in the presence of weakly acidic catalysts or, if desired, readily curable solutions thereof in organic solvents can advantageously be mixed with other substances, such as, for example, self-crosslinking compounds or compounds acting as plasticizers, and thus be further modified with respect to their properties. Preferred plasticizing additional components are epoxy resins.

To prepare self-curing cements or coating compositions, the readily curable furan resin solutions according to the invention modified with phenol resins are mixed with inert fillers and a curing agent which even at room temperature effects curing of the readily curable resin solution. Preferably, the curing agent and the inert filler are intimately mixed to give a stable mixture, and this mixture is then, if desired for producing cement or binder compositions or coating compositions, mixed with the abovementioned readily curable furan resin solutions according to the invention modified with phenolic resins in the desired mixing ratio at room temperature until a homogeneous mixture is obtained, shortly after which curing of the cement or the binder composition or the coating composition starts at the mixing temperature. The relative amount in which the curing agent is used must be such that after mixing the reactive resin solution is complete, the resulting self-curing cement or the resulting self-curing binder or coating composition remains usable, i.e. soft to pourable, for at least about 30 minutes to 2 hours, until it solidifies to give an insoluble solid cement composition or coating composition. The readily curable furan resin solutions according to the invention modified with phenolic resins can also be used as coating or casting compositions without the addition of inert materials or fillers and cured by addition of a curing agent metered in as required at standard temperature or with heating.

Accordingly, the invention also provides self-curing cements and coating compositions containing a readily curable furan resin modified with phenolic resins, furfuryl alcohol and, if desired, further organic solvents and a curing agent, wherein the self-curing cements and coating compositions are obtainable by mixing the following components:

A) A readily curable furan resin modified with phenolic resins based on condensation products of alkylidenepolyphenols and furfuryl alcohol or mixtures of furfuyl alcohol with other reactive furan derivatives, prepared in the presence of an acid catalyst at reaction temperatures of, preferably, 80° to 250° C. and dissolved in furfuryl alcohol or mixtures thereof with other reactive furan derivatives or other reactive organic solvents, if desired with addition of inert organic solvents, B) at least one filler, and C) at least one curing agent for resin solution A), preferably an acid curing catalyst.

Mixing of components A), B) and C) is preferably carried out at standard room temperature.

The weight ratio of the readily curable furan resin solution modified with phenolic resins A) to the sum of components B) and C) is preferably 1:0.5 to 7, in particular 1:1 to 4.

The readily curable furan resin solutions modified with phenolic resins A) used have a readily curable furan resin modified with phenolic resins content of, preferably, 10 to 75% by weight, in particular 25 to 70% by weight, particularly preferably 35 to 55% by weight, relative to the total readily curable furan resin solution modified with phenolic resins A).

Preferred reactive solvents used for preparing the readily curable furan resin solutions modified with phenolic resins are furfuryl alcohol or mixtures thereof with other reactive diluents, the furfuryl alcohol content in the mixtures being preferably at least 90% by weight, relative to the mixture. Examples of other reactive diluents which can replace the furfuryl alcohol in the mixtures are hydroxybenzyl alcohol, low-molecular weight epoxy compounds, in particular diglycidyl ether and diphenylolpropane diglycidyl ether, furthermore preferably furfurol and difuryl ether. In the condensation reaction according to the invention with the alkylidenepolyphenols, the furfuryl alcohol, for example, can preferably already be used in excess as reaction component, and the excess can remain, after reaction is complete, in the reaction mixture as reactive solvent.

The readily curable resin solution can additionally contain inert, non-reactive organic solvents or diluents. Suitable inert organic solvents or diluents are preferably aromatic solvents, in particular toluene or xylene. The viscosity of the readily curable furan resin solutions modified with phenolic resins A) is preferably in the range between 50 and 20,000 mPa.s, in particular between 100 and 1500 mPa.s, as measured in a Höppler viscometer in accordance with DIN 53015 at 23° C.

In the absence of curing agents C), the readily curable furan resin solutions modified with phenolic resins A) prepared according to the invention have a virtually unlimited shelf life.

Fillers B) used for preparing cements are preferably powdered rock, in particular finely powdered clays, powdered grogs, powdered quartz, furthermore barium sulfate powder and, particularly preferably, carbon powder, in particular carbon powder, coke powder and ground graphite, for example synthetic graphite powder.

Suitable curing agents C) for curing the cements are preferably strongly acidic substances or substances forming strong acids. Examples of preferred materials are a) inorganic or organic acids, in particular from the group comprising sulfuric acid, hydrochloric acid, phosphoric acid, phosphonic acids, sulfonic acids, such as sulfamic acid, mono- and disulfonic acids of benzene, toluene, xylene and of phenols, naphthalenedisulfonic acids, furthermore urea adducts of aromatic and hydroxyaromatic sulfonic acids, b) acid-releasing substances, preferably from the group comprising sulfonyl chlorides, such as benzenesulfonyl chloride, toluenesulfonyl chloride, xylenesulfonyl chloride, naphthalenedisulfonyl chloride, furthermore acid monoesters of sulfuric acid, acid monoesters or diesters of phosphoric acid, acid salts or sulphuric acid or phosphoric acid, preferably alkali metal salts thereof, in particular sodium salts.

To prepare cements, fillers B) and curing agents C) are preferably used in previously mixed pulverulent form as so-called cement powder. In these pulverulent mixtures, the content of curing agent component C) is preferably 4 to 12% by weight, in particular 6 to 8% by weight, relative to the mixture of filler B)+curing agent C). The latter mixtures have an unlimited shelf life in corrosion-resistant and tightly sealed containers.

The self-curing cements according to the invention are prepared in such a manner that the readily curable solution of the furan resin modified with phenolic resins A) is intimately mixed with filler B) and curing agent C) immediately before use of the cement, components B) and C) being preferably used in a previously mixed form as so-called cement powder and mixed with the readily curable furan resin solution A), preferably at room temperature. The resulting cement is immediately applied to or between the materials to be joined, smoothed and cured, preferably at room or ambient temperature, by customary methods.

The properties used for evaluating the cement quality include the properties of the readily curable furan resin solution modified with phenolic resins, the cement properties, in particular the processing characteristics following mixing of the readily curable furan resin solution modified with phenolic resins A) with the cement powder, the curing pattern of the cement and the chemical and physical properties of the cured cement end product. For use as cement binder, the readily curable furan resin modified with phenolic resins used according to the invention should have a very low degree of condensation, and its readily curable solution should exhibit inter alia low viscosity due to the low degree of condensation, in order to enable it to flow easily and rapidly and to effectively wet and penetrate the cement powder. If desired, these properties can be varied by changing the amount of reactive or inert diluents, thus optimizing the processibility of the cement. A long shelf life of the readily curable furan resin solution modified with phenolic resins A) is a further important requirement for optimum usability of the product. Accordingly, the degree of condensation of the resin should increase, if at all, only insignificantly during storage of the resin solution A), since an excessive increase in viscosity would lead to poorer wetting of the cement powder and thus to processing faults and damages. When preparing the readily curable furan resin modified according to the invention by alkylidenepolyphenols, the weakly acidic condensation catalyst can, if desired, after condensation is complete, be advantageously removed or neutralized by addition of base, so that no acid-catalysed crosslinking reactions can take place in the resulting readily curable furan resin solution modified with phenolic resins A) during storage time.

Preparation of the self-curing cement, which takes place immediately before its application, is followed, after mixing the cement powder (=mixture of filler B) and curing agent C)) with the readily curable furan resin solution modified with phenolic resins A) by a polymerization reaction, due to the catalytic effect of curing agent C) in which the readily curable furan resin molecules modified with phenolic resins are increased in size by polymerization and copolymerization with each other and with the reactive solvent components, preferably with furfuryl alcohol or mixtures thereof with other reactive furan derivatives or reactive solvents. The usable time or pot life of the freshly prepared self-curing cement mixture, i.e. the period between mixing of components A)+B)+C) and loss in processing consistency should preferably be at least 30 minutes to 2 hours, in order to allow convenient and careful processing of the cement. After processing, the cement should desirably completely cure at room temperature within a very short period of time and soon acquire its expected adhesive efficacy, solidity and resistance to chemicals, solvents and thermal stress.

To prepare curable coating compositions, the readily curable furan resins according to the invention modified with phenolic resins can preferably also be dissolved in non-reactive, inert organic solvents such as are customary in the paint technology sector. Before use, these solutions can be mixed with an acid catalyst which acts as a crosslinking agent, for example such as listed above under C) as curing agent and, if desired, additionally with plasticizing substances, preferably with epoxy resins, and the resulting mixtures, after being employed, can be crosslinked and cured. Crosslinking and curing is preferably carried out in the heat at temperatures of >130° C., in particular at baking temperatures of between 200° and 250° C.

The cured cements and coating compositions obtained according to the invention have very good resistance to solvents and chemicals. They possess excellent thermal stability and, when used as binders for ceramic brick lining and joint-filling compositions they display surprisingly long-term heat resistances. They are preferably used as binders for brick lining of flue gas scrubbers and chimneys with tile coverings made of acid- and heat-resistant ceramic materials, in particular in plants for commercial purposes and those on a large industrial scale.

The invention will be illustrated in more detail by the examples below. In the examples, pbw refers to parts by weight.

EXAMPLE 1

1. Preparation of a readily curable furan resin solution modified with phenolic resins 1.1. Preparation of the starting alkylidenepolyphenol 940 pbw of phenol, 9.4 pbw of oxalic acid and 500 pbw of aqueous 30% by weight formaldehyde are refluxed for 3 hours. The volatile components are then removed from the reaction mixture first at atmospheric pressure, then at an aspirator vacuum, with the flask temperature rising up to 220° C. The temperature of 220° C. is maintained for another hour to give 700 parts of an alkylidenepolyphenol having a softening point of 47° C. and a free phenol content of 0.03% by weight.

1.2 Reaction of the alkylidenepolyphenol with furfuryl alcohol 1545 pbw of the alkylidenepolyphenol obtained in Example 1.1 are dissolved in 735 pbw of furfuryl alcohol and 100 pbw of xylene, 4 pbw of maleic anhydride are added, and the mixture is heated to 180° C. in a glass flask reactor equipped with stirrer, thermometer, reflux condenser and water separator. The water separator had previously been filled with xylene. Distillation of the reaction mixture with stirring leads to the separation of 136 pbw of water in the water separator over a period of 3.5 hours. Separation of water begins at 142° C. After the condensation reaction and thus also water separation is complete, an aspirator vacuum is applied, and all distillable components are distilled off up to a flask temperature of 200° C. 141 pbw of vacuum distillate are obtained. 2119 pbw of readily curable furan resin modified with phenolic resins remain in the reactor. They are dissolved in 1954 pbw of furfuryl alcohol to give a readily curable furan resin solution modified with phenolic resins. After a residue of 47.6 pbw of the solid has been separated off following the heating of the readily curable furan resin solution modified with phenolic resins to 200° C. for one hour, the viscosity of the resulting residue-free resin solution is 896 mPa.s as measured in a Höppler viscometer according to DIN 53015 at 23° C.

1.3. Cement production

A cement powder is prepared from 96.5 pbw of carbon powder (coke powder) and 3.5 pbw of an aqueous solution of a phenolsulfonic acid/urea adduct containing 65% by weight of phenolsulfonic acid. To prepare a self-curing cement, 60 pbw of the residue-free resin solution from Example 1.2 are mixed with 100 pbw of, the cement powder. The self-curing cement produced therefrom has a pot life of 50 minutes at room temperature. After 24 hours, the cured cement possesses a Shore hardness D of 65.

1.4 Cement test 1.4.1. Chemical test

In order to determine the chemical resistance, the self-curing cement from Example 1.3 is used to produce cylindrical cement test specimens 25 mm each in height and 25 mm diameter by giving the plastic cement composition the appropriate shape, followed by curing, and these test specimens are stored at room temperature for 8 days. After this time, the cured test specimens are resistant to boiling 70% by weight sulfuric acid, boiling concentrated hydrochloric acid and to butyl acetate and toluene, as demonstrated by the corresponding 40-hour tests.

1.4.2 Physical test

Linear shrinkage during cement curing is measured on cylindrical self-curing cement test specimens 25 mm in diameter and 90 mm in length prepared by the method of Example 1.4.1, at the ends of which measurement marks made of glass each 5 mm in length have been attached. The total length, including the measurement marks, is about 100 mm. The test is carried out analogously to the test method according to ASTM C 358. The first length measurement takes place 24 hours after preparation of the self-curing test specimens and serves as initial value. Shrinkage at room temperature over an observation period of 100 days is 0.16%.

The flexural modulus of elasticity (E-modulus) is measured on cured cement test specimens 10×15×120 mm in size. After the cement prepared according to Example 1.3. and cured in the form of the test specimen has been stored at room temperature for 8 days, the modulus of elasticity has a value of $0.65 \times 10^4$ N/mm$^2$.

1.4.3 Heat resistance test

To determine the heat resistance, cured cylindrical cement test specimens 50 mm in diameter and 50 mm in height are used. These test specimens are subjected to controlled heat treatment which, up to a temperature of 300° C., is carried out in a heating cabinet and above 300° C. in an oven. The controlled heat treatment in air is carried out by the following program:

The cured cement test specimens are first stored at room temperature for 8 days. This is followed by:

In a drying cabinet:
1. Heating from room temperature to 90° C. over a period of 8 hours (h)
2. Maintaining the temperature of 90° C. for 16 h
3. Heating from 90° C. to 150° C. over a period of 8 h
4. Maintaining the temperature of 150° C. for 16 h
5. Heating from 150° C. to 200° C. over a period of 8 h
6. Maintaining the temperature of 200° C. for 16 h
7. Heating from 200° C. to 250° C. over a period of 8 h
8. Maintaining the temperature of 250° C. for 16 h
9. Heating from 250° C. to 300° C. over a period of 8 h
10. Maintaining the temperature of 300° C. for 16 h In an oven:
11. Heating from 300° C. to 350° C. over a period of 8 h
12. Maintaining the temperature of 300° C. for 16 h
13. Heating from 350° C. to 400° C. over a period of 8 h
14. Maintaining the temperature of 400° C. for 16 h
15. Heating from 400° C. to 450° C. over a period of 8 h
16. Maintaining the temperature of 450° C. for 16 h
17. Heating from 450° C. to 500° C. over a period of 8 h
18. Maintaining the temperature of 500° C. for 16 h The measurement or evaluation of the test specimens with respect to compressive strength in N/mm$^2$ which is determined in a hydraulic platen press, surface gloss, which is determined visually, chalking, which is determined by manual rub test, bursting in the heat treatment and change in weight in the heat treatment is carried out after each temperature step and in each case at room temperature (20° C.)

using separate test specimens. Resistance to 70% by weight sulfuric acid is measured in the 40-hour test at 150° C., and the resistance to acetone in the 40-hour test at the boiling temperature of acetone. For each test, three test specimens each are taken, tested, and the results are averaged. A summary of the results is shown in Table 1.

COMPARATIVE EXAMPLE 1

Repetition of Example 1 of EP-A 0,184,106

1.1 Preparation of a readily curable furan resin solution modified with epoxy resins 1425 pbw of an epoxy resin based on diphenylolpropane and epichlorohydrin and having an average epoxide equivalent weight of 425 are dissolved in a reaction vessel equipped with stirrer and thermometer in 2013 pbw of furfuryl alcohol, and the solution is brought to a temperature of 60° C. After addition of 25.5 pbw of 33% by weight aqueous sodium hydroxide solution, the reaction mixture is heated to 100° C. and stirred at this temperature for 4 hours. To complete the reaction, the reaction mixture is then heated at 170° C. for another hour, after which the resulting resin solution from which small amounts of solid residues have been separated off has a solids content of 49.3% by weight and a viscosity of 1250 mPa.s as measured in a Höppler viscometer according to DIN 53015 at 20° C. The alkali catalyst is neutralized by addition of 19.1 pbw of aqueous 80% by weight lactic acid to give a readily curable furan resin solution modified with epoxy resins of viscosity 1200 mPa.s as measured at 20° C.

1.2 Cement production

A cement powder (100 pbw) is prepared from 93 pbw of carbon powder (coke powder) and 6 pbw of a β-naphthalenesulfonic acid/urea adduct and 1 pbw of p-toluenesulfonic acid and mixed with 60 pbw of the readily curable furan resin solution modified with epoxy resins from Comparative Example 1.1. The self-curing cement resulting therefrom has a pot life of 75 minutes at 20° C. and reaches a Shore hardness D of 45 after curing for 4 hours.

1.3. Cement test 1.3.1. Chemical test

In order to determine the chemical resistance, the self-curing cement prepared by the method of Comparative Example 1.2. is used to produce cylindrical cement test specimens 25 mm in height and 25 mm diameter by giving the plastic cement composition the appropriate shape, followed by curing, and these test specimens are stored at 20° C. for 8 days. After this time, the cured test specimens are resistant to boiling 70% by weight sulfuric acid, boiling concentrated hydrochloric acid and to concentrated and dilute sodium hydroxide solution, as demonstrated by the results of the corresponding 40-hour tests.

1.3.2 Physical test

Linear shrinkage during cement curing is measured on cylindrical self-curing cement test specimens 25 mm in diameter and 90 mm in length prepared by the method of Comparative Example 1.3.1. at the ends of which measurement marks made of glass each 5 mm in length have been attached. The total length, including the measurement marks, is about 100 mm. The test is carried out analogously to the test method according to ASTM C 358. The first length measurement takes place 24 hours after preparation of the self-curing test specimens and serves as initial value. Shrinkage at room temperature over an observation period of 94 days is 0.18%.

1.3.3. Heat resistance

The heat resistance of the cured cement test specimens is tested by the method of Example 1.4.3. A summary of the results is shown in Table 1.

As shown by the results in Table 1, the test specimens of Example 1 according to the invention have substantially more advantageous properties, in particular in the temperature range between 200° and 400° C., than the test specimens of Comparative Example 1, thus opening up interesting possible applications for the products according to the invention.

TABLE 1

Changes in properties of cured cement test specimens from Example 1 and Comparative Example 1 by a long-term heat treatment between 20 and 400° C.

| Treatment time of the test specimens in hours (h) at different temperatures (°C.) Test specimen | Compressive strength N/mm² | | Surface gloss | | Chalking | | Bursting during heat treatment | | Loss in weight during heat treatment (% by wt.) | | Chemical resistance to 70% by wt. sulfuric acid at 150°C. Change in weight in the 40-hour test (% by wt.) | | Chemical resistance to acetone at the boiling temperature Change in weight in the 40-hour test (% by wt.) | |
|---|---|---|---|---|---|---|---|---|---|---|---|---|---|---|
| from Example or Comp. Ex. | Ex. 1 | Comp. Ex. 1 | Ex. 1 | Comp. Ex. 1 | Ex. 1 | Comp. Ex. 1 | Ex. 1 | Comp. Ex. 1 | Ex. 1 | Comp. Ex. 1 | Ex. 1 | Comp. Ex. 1 | Ex. 1 | Comp. Ex. 1 |
| Room temperature after 8 days | 44.2 | 37.3 | yes | yes | no | no | no | no | 0.04 | 0.06 | −1.468 | +1.591 | | |
| +16 h 90° C. | 62.2 | 58.8 | yes | yes | no | no | no | no | 0.15 | 0.33 | −1.298 | +0.019 | +7.492 | +3.131 |
| +16 h 150° C. | 62.0 | 41.4 | yes | yes | no | no | no | no | 0.66 | 2.86 | −0.569 | +0.940 | −0.075 | −0.024 |
| +16 h 200° C. | 43.7 | 23.4 | yes | yes | no | no | no | no | 4.55 | 6.51 | +0.339 | +2.520 | +0.319 | +1.003 |
| +16 h 250° C. | 38.7 | 22.6 | yes | some | no | no | no | no | 5.75 | 8.27 | +0.671 | +0.388 | +0.209 | +1.525 |
| +16 h 300° C. | 35.7 | 14.4 | some | no | no | yes | no | yes | 7.30 | 13.22 | +0.689 | +4.309 | +0.365 | +4.544 |
| +16 h 350° C. | 31.6 | | some | | some | | no | | 10.83 | | +2.472 | | +1.317 | |
| +16 h 400° C. | 18.0 | | no | | yes | | no | | 32.78 | | | | | |

We claim:

1. A curable furan resin modified with phenolic resins for cements and coating compositions based on condensation products of furan compounds with phenols and solutions thereof in organic solvents, wherein the curable furan resin modified with phenolic resins comprises condensation products of alkylidenepolyphenols of the novolak type with 0.2 to 0.8 mole of furfuryl alcohol or mixtures of furfuryl alcohol with other reactive furan derivatives per mole equivalent of phenolic hydroxy group, in which the alkylidenepolyphenols in the ortho and/or para positions relative to the phenolic hydroxyl groups are substituted by 2-furylmethyls which condensation products are obtained by reaction of alkylidenepolyphenols with furfuryl alcohol or mixtures thereof with other reactive furan derivatives in the presence of weakly acidic catalysts with elimination of water at reaction temperatures of 140° to 250° C., the acid catalyst being optionally neutralized or removed after reaction is complete, or the furan resins together with excess furfuryl alcohol remaining in the reaction mixture or subsequently admixed furfuryl alcohol or mixtures thereof with other reactive organic solvents, optionally with additional amounts of inert solvents, forming readily curable, low- or high-viscosity resin solutions.

2. The curable resin modified with phenolic resins as claimed in claim 1, wherein the furan resin contains, as phenolic component, multinuclear phenol units containing at least two OH groups in the molecule, each of which has more than one reactive ring hydrogen atom in the ortho/ortho and/or para position per phenolic OH group and a number average molecular weight of 200 to 3000.

3. The curable furan resin modified with phenolic resins as claimed in claim 1, wherein the furan resin contains, as furan component, units comprising furfuryl alcohol or mixtures thereof with furan derivatives selected from the group consisting of furfurol and hydroxymethylfurfurol, the furfuryl alcohol content being at least 50% by weight, relative to the mixture of furan derivatives.

4. The curable furan resin modified with phenolic resins as claimed in claim 1, wherein the furan resin is present as a readily curable solution in reactive solvents which may additionally contain inert, inorganic solvents, the readily curable furan resin content being 10 to 75% by weight, relative to the total readily curable furan resin solution, and the viscosity of the furan resin solution being in the range from 50 to 20,000 mPa.s, as measured in a Höppler viscometer according to DIN 53015 at 23° C.

5. A process for preparing a furan resin modified with phenolic resins for a cement and coating composition based on condensation products of furan compounds with phenols and solutions thereof in organic solvents as claimed in claim 1, which comprises reacting alkylidenepolyphenols of the novolak type and 0.2 to 0.8 mole of furfuryl alcohol or mixtures of furfuryl alcohol with other reactive furan derivatives per mole equivalent of phenolic hydroxy group with the addition of weakly acidic catalysts with elimination of water, optionally with continuous removal of the water of reaction by azeotropic distillation by means of an inert entrainer, at reaction temperatures of 140° to 250° C., optionally neutralizing or removing the acid catalyst after the condensation reaction is complete, and recovering the furan resin, or converting the furan resin together with excess or subsequently admixed reactive organic solvents remaining in the reaction mixture, optionally with additional amounts of inert solvent, into a readily curable, low- or high-viscosity, stable resin solution and isolating it.

\* \* \* \* \*